(12) United States Patent
Mueller

(10) Patent No.: US 10,484,238 B2
(45) Date of Patent: Nov. 19, 2019

(54) RADIO COMMUNICATION SYSTEM FOR AN INDUSTRIAL AUTOMATION SYSTEM, METHOD FOR OPERATING SAID RADIO COMMUNICATION SYSTEM, AND RADIO TRANSCEIVER STATION

(71) Applicant: Siemens Aktiengesellschaft, Munich (DE)

(72) Inventor: Joerg Mueller, Linkenheim (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/080,919

(22) PCT Filed: Jan. 26, 2017

(86) PCT No.: PCT/EP2017/051626
§ 371 (c)(1),
(2) Date: Aug. 29, 2018

(87) PCT Pub. No.: WO2017/148626
PCT Pub. Date: Sep. 8, 2017

(65) Prior Publication Data
US 2019/0116086 A1 Apr. 18, 2019

(30) Foreign Application Priority Data
Feb. 29, 2016 (EP) ..................... 16157795

(51) Int. Cl.
*H04L 12/24* (2006.01)
*H04L 12/40* (2006.01)
(Continued)

(52) U.S. Cl.
CPC .......... *H04L 41/0806* (2013.01); *H04L 12/40* (2013.01); *H04L 12/4641* (2013.01);
(Continued)

(58) Field of Classification Search
CPC ....... H04L 47/10; H04L 47/50; H04L 12/403; H04L 67/32; H04W 28/26; H04W 28/20
See application file for complete search history.

(56) References Cited

U.S. PATENT DOCUMENTS 7,457,973 B2 * 11/2008 Liu ................... H04W 52/0216
713/310
7,885,639 B1 * 2/2011 Satish ...................... H04L 9/32
455/410

(Continued)

FOREIGN PATENT DOCUMENTS

DE 102011004064 8/2012
DE 102012209509 12/2013
(Continued)

OTHER PUBLICATIONS

Kassis M. et al.: "Analysis of parallel redundant WLAN with timing diversity"; 2013 World Congress on Computer and Information Technology (WCCIT), IEEE; XP032494886; pp. 1-6; DOI: 10.1109/WCCIT.2013.6618663; ISBN: 978-1-4799-0460-0;; 2013.

(Continued)

*Primary Examiner* — Raj Jain
(74) *Attorney, Agent, or Firm* — Cozen O'Connor

(57) ABSTRACT

A radio communication system for an industrial automation system in which at least one first communication device and one second communication device are redundantly connected to an industrial communication network, wherein the first and second communication devices are each connected directly or indirectly to a particular first radio transceiver station and to a particular second radio transceiver station via the first communication network connection and via the second communication network connection thereof, where the first and second radio transceiver stations determine an order for data frames to be transmitted inside a predefined interval of time based on destination MAC addresses (Continued)

assigned to the data frames to be transmitted, and where the order within data frames to be transmitted to a selected destination MAC address is determined by the order in which the data frames are received.

18 Claims, 4 Drawing Sheets

(51) Int. Cl.
    *H04L 29/06*     (2006.01)
    *H04L 12/863*     (2013.01)
    *H04L 29/08*     (2006.01)
    *H04L 29/12*     (2006.01)
    *H04L 12/46*     (2006.01)
    *H04L 1/02*     (2006.01)
    *H04L 1/08*     (2006.01)
    *H04W 84/12*     (2009.01)

(52) U.S. Cl.
    CPC .......... *H04L 47/50* (2013.01); *H04L 61/6022* (2013.01); *H04L 67/32* (2013.01); *H04L 69/18* (2013.01); *H04L 1/02* (2013.01); *H04L 1/08* (2013.01); *H04L 47/625* (2013.01); *H04W 84/12* (2013.01)

(56) References Cited

U.S. PATENT DOCUMENTS

| | | | |
|---|---|---|---|
| 2002/0089959 A1* | 7/2002 | Fischer | H04L 1/08 370/338 |
| 2003/0095560 A1 | 5/2003 | Arita et al. | |
| 2007/0211624 A1* | 9/2007 | Schmidt | H04L 12/5692 370/225 |
| 2009/0213865 A1* | 8/2009 | Stephens | H04L 47/10 370/412 |
| 2010/0040030 A1* | 2/2010 | Kakumaru | H04L 63/04 370/338 |
| 2012/0019674 A1* | 1/2012 | Ohnishi | G08C 17/00 348/207.1 |
| 2013/0070600 A1* | 3/2013 | Nakajima | H04L 47/762 370/235 |
| 2013/0315103 A1 | 11/2013 | Riedl et al. | |
| 2014/0106770 A1* | 4/2014 | Valentin | H04L 67/32 455/452.1 |
| 2014/0341224 A1 | 11/2014 | Armbruster et al. | |
| 2015/0333793 A1 | 11/2015 | Rentschler et al. | |
| 2017/0019933 A1* | 1/2017 | Zhao | H04W 74/0866 |

FOREIGN PATENT DOCUMENTS

| | | |
|---|---|---|
| DE | 102011082965 | 3/2014 |
| DE | 102013226980 | 6/2014 |
| DE | 102013211406 | 12/2014 |
| EP | 2712124 | 9/2012 |
| WO | WO2014/187893 | 11/2014 |

OTHER PUBLICATIONS

Cena Gianluca et al: "An enhanced MAC to increase reliability in redundant Wi-Fi networks"; 2014 10th IEEE Workshop on Factory Communication Systems (WFCS 2014), IEEE; pp. 1-10; XP032608485; DOI: 10.1109/WFCS.2014.6837591; 2014.

Towards a Reliable Parallel Redundant WLAN Black Channel; Markus Rentschler, Towards a Reliable Parallel Redundant WLAN Black Channel, Hirschmann Automation & Control GmbH 72654 Neckartenzlingen, DE, 2012; 2012.

PCT International Search Report and Written Opinion of International Searching Authority dated Aug. 3, 2017 corresponding to PCT International Application No. PCT/EP2017/051626 filed Feb. 26, 2017.

* cited by examiner

RADIO COMMUNICATION SYSTEM FOR AN INDUSTRIAL AUTOMATION SYSTEM, METHOD FOR OPERATING SAID RADIO COMMUNICATION SYSTEM, AND RADIO TRANSCEIVER STATION

CROSS-REFERENCE TO RELATED APPLICATIONS

This is a U.S. national stage of application No. PCT/EP2017/051626 filed Jan. 26, 2017. Priority is claimed on EP Application No. 16157795 filed Feb. 29, 2016, the content of which is incorporated herein by reference in its entirety.

BACKGROUND OF THE INVENTION

1. Field of the Invention

The present invention relates to a radio transceiver station, a radio communication system for an industrial automation system, and a method for operating the radio communication syste.

2. Detailed Description of the Related Art

Industrial automation systems are used to monitor, control and regulate technical processes, particularly in the field of manufacturing, process and building automation, and make it possible to operate control devices, sensors, machines and industrial installations in a manner that is intended to be as independent as possible and independent of human interventions. On account of a constantly increasing importance of information technology for automation systems comprising numerous networked control or computer units, methods for reliably providing functions distributed across an automation system for providing monitoring, control and regulation functions are becoming increasingly important.

Interruptions in communication connections between computer units of an industrial automation system or automation devices may result in undesirable or unnecessary repetition of the transmission of a service request. This causes additional utilization of communication connections of the industrial automation system, which may result in further system faults or errors. In addition, untransmitted messages or incompletely transmitted messages may prevent an industrial automation system from changing to or remaining in a safe operating state, for example. This may finally result in failure of an entire production installation and costly production downtime. A particular problem regularly results in industrial automation systems from message traffic with a comparatively large number of, but relatively short, messages, thus intensifying the above problems.

In order to be able to compensate for failures of communication connections or devices, communication protocols, such as Media Redundancy Protocol, High-availability Seamless Redundancy or Parallel Redundancy Protocol, have been developed for highly available industrial communication networks that can be operated in a redundant manner. The Media Redundancy Protocol (MSR) is defined in the International Electrotechnical Commission (IEC) 62439 standard and makes it possible to compensate for individual connection failures in networks having a simple ring topology in the case of bumpy redundant transmission of messages. According to the Media Redundancy Protocol, a redundancy manager is assigned to a switch having two ports inside the ring topology, where the redundancy manager monitors the network for connection failures and possibly initiates a switching measure to close the ring.

Bumpy media redundancy methods can be implemented, in principle, with relatively little effort. However, the disadvantage is that, on the one hand, messages may be lost in the event of a fault and, on the other hand, a fault state is first of all present during reconfiguration of a communication network. Such a fault state must be safeguarded via a superimposed communication protocol, for example using TCP/IP on the network or transport layer, in order to avoid an interruption in a communication connection.

PROFINET (IEC 61158 Type 10) also refers to the Media Redundancy Protocol as a bumpy media redundancy method inside a communication network with a ring topology. In contrast, Media Redundancy Planned Duplication (MRPD) is an extension for bumpless transmission of isochronous real-time data. However, Media Redundancy Planned Duplication is not an application-neutral bumpless media redundancy method but rather a PROFINET-specific extension.

High-availability Seamless Redundancy (HSR) and the Parallel Redundancy Protocol (PRP) are defined in the IEC 62439-3 standard and make it possible to bumplessly transmit messages in a redundant manner with extremely short recovery times. According to High-availability Seamless Redundancy and the Parallel Redundancy Protocol, each message is duplicated by a transmitting communication device and is sent to a receiver on two different paths. A communication device at the receiver end filters redundant messages constituting duplicates from a received data stream.

The IEC 62439-3 standard has previously prescribed exclusively wired transmission paths for the Parallel Redundancy Protocol (PRP) on account of relatively long latency delays in wireless communication systems and a non-deterministic transmission behavior caused thereby. Suitability of WLAN transmission paths in PRP communication networks is investigated in "Towards a Reliable Parallel Redundant WLAN Black Channel", Markus Rentschler, Per Laukemann, IEEE 2012. Parallel application of various diversity techniques for space, time and frequency, for example, can be used to compensate adequately for effects of stochastic channel fading in WLAN communication networks.

EP 2 712 124 A1 discloses a redundantly operated industrial communication system having communication devices redundantly connected to an industrial communication network, in which messages are transmitted wirelessly at least in sections. A plurality of buffer storage units for message elements received in a wired manner at a network node and for message elements to be wirelessly transmitted by the latter are provided in the industrial communication network. If a maximum buffer size is exceeded, an oldest message element in the respective buffer storage unit is deleted. Until the maximum buffer size is exceeded, the oldest message element is selected as the next message element to be wirelessly transmitted.

DE 10 2012 209509 A1 describes an apparatus for securely transmitting data between a mobile subscriber having at least one transmission apparatus and a stationary receiver. Here, the mobile subscriber can change between a plurality of radio cells. Each radio cell has at least one transmission apparatus that is connected to at least one network in a wired manner. The stationary receiver is likewise connected to the at least one network in a wired manner. Both the wireless transmission between the mobile subscriber and the respectively associated transmission apparatus and the wired transmission of data between the transmission apparatus and the at least one associated network are performed in a redundant manner. The stationary receiver is connected to the network in a redundant and wired manner.

In order to connect automation devices having completely independent Ethernet interfaces within a redundant communication network to singly connected automation devices in a highly available manner, a Y switch is used for the respective singly connected automation device as disclosed in DE 10 2013 211406 A1. Here, the Y switch is connected to a first or second subnetwork of the redundant communication network via a first or second port, while the Y switch is directly connected or indirectly connected via a third port to the singly connected automation device. In addition, incoming data frames at the first, second and third ports are assigned to a first, second and third VLAN, respectively. In addition, the first and second ports are set up as untagged members for the first and third VLANs or for the second and third VLANs. The third port is set up as an untagged member for all three VLANs. Unicast MAC addresses learnt at the first two ports are automatically adopted as a static entry for the third VLAN. If a unicast MAC address learnt at the first two ports is deleted, the corresponding static entry for the third VLAN is also deleted.

DE 10 2011 082965 A1 discloses a method for operating a network arrangement comprising a plurality of network devices coupled to one another in a ring structure. Here, each network device has a control device and a switch device having at least two ports for coupling to a communication path. During operation, at least two VLANs are simultaneously provided in the ring structure. Here, a data packet is transmitted from the control device of a selected network device to one of the two VLANs via a port of the switch device. Here, the other port of the switch device of the selected network device is deactivated for the one VLAN. Redundant reliable transmission of data is possible through the use of two VLANs. Destabilization of the VLANs in the network ring is prevented by deliberately deactivating particular ports of the transmitting network device.

DE 10 2011 004064 A1 discloses an intermediate network in a ring topology for establishing a connection between two network domains, where the intermediate network comprises a first boundary node and a second boundary node that are boundary nodes of a first network domain. These boundary nodes are connected to one another via a first network connection within the first network domain. A third boundary node and a fourth boundary node that are boundary nodes of a second network domain are additionally provided. These boundary nodes are connected to one another via a second network connection within the second network domain. A first virtual network connection connects the first and third boundary nodes via an intermediate network. A second virtual network connection connects the second and fourth boundary nodes via the intermediate network. The first network connection, the second network connection, the first virtual network connection and the second virtual network connection have a ring topology in which a connection redundancy protocol is implemented.

SUMMARY OF THE INVENTION

It is an object of the present invention to provide a failsafe radio communication system for an industrial automation system, where the radio communication system enables more efficient use of radio resources, to provide a method for operating the radio communication system and to provide suitable system components.

These and other objects and advantages are achieved in accordance with the invention by a communication system a method and a radio transceiver station, where the communication system in accordance with the invention comprises at least a first communication device and a second communication device that are redundantly connected to an industrial communication network and that each have at least a first communication network connection and a second communication network connection. A signal processing unit is connected to the first and second communication network connections, where the signal processing unit has a multiplexer unit for forwarding data frames to be transmitted to both communication network connections in a parallel manner and a redundancy handling unit for processing data frames received from both communication network connections. Here, the redundancy handling unit comprises a filter unit that is configured to detect received redundant data frames, in particular via appropriate configuration.

In accordance with the invention, the first and second communication devices are each connected directly or indirectly via their first communication network connection to a respective first radio transceiver station. In a similar manner, the first and second communication devices are each connected directly or indirectly via their second communication network connection to a respective second radio transceiver station. An indirect connection can be effected, for example, using a switch to which the respective communication device and the respective radio transceiver stations are connected. The radio transceiver stations may be assigned, for example, to a Wireless Local Area Network, a Worldwide Interoperability for Microwave Access (WiMAX), a Universal Mobile Telecommunication System (UMTS), a Long Term Evolution (LTE) mobile radio network or another mobile radio network. In addition, the first and second radio transceiver stations are configured such that an order for data frames to be transmitted within a predefined interval of time is determined based on destination Media Access Control (MAC) addresses assigned to the data frames to be transmitted, instead of according to an FIFO principle. In this case, the order within data frames to be transmitted to a selected destination MAC address is determined by the order in which they are received. In addition, the first and second radio transceiver stations are configured and such that the first and second radio transceiver stations connected to the same communication device coordinate their orders for data frames to be transmitted such that both radio transceiver stations always transmit data frames to different destination MAC addresses. This can be implemented, for example, via a transmission token or a mutex which is assigned to a given destination MAC address.

The radio communication system in accordance with the invention provides the advantage that the two radio transceiver stations do not have to be simultaneously occupied by mutually redundant data traffic for the same receiver, but rather they can be used for different receivers at the same time via appropriate transmission queue management. This results in more efficient utilization of resources and an increased effective data transmission rate. If different frequency bands are used for both radio transceiver stations, a likelihood of interference at the same time is also very low.

In accordance with one advantageous embodiment of the present invention, mutually redundant data frames are indicated by a uniform sequence number. Here, the signal processing units in the first and second communication devices are configured to allocate a sequence number to a data frame to be redundantly transmitted. The first and second radio transceiver stations are preferably configured such that, if a data frame transmitted via the first or second radio network is successfully received, then a confirmation message is transmitted, at the receiver end, to a radio transceiver station at the transmitter end. Furthermore, the radio transceiver stations are preferably configured such that transmission of a redundant data frame having a sequence number assigned to a confirmation message received at the transmitter end is prevented. If a data frame has already been transmitted using a faster radio connection, for example, a data frame that is redundant with respect to the data frame no longer needs to be delayed or transmitted using a slower radio connection, but rather can be discarded at the transmitter end. This enables more efficient utilization of resources.

Data frames to be redundantly transmitted are preferably transmitted according to High-availability Seamless Redundancy (HSR) and/or according to the Parallel Redundancy Protocol (PRP). In this case, the first and second communication devices may be an HSR and/or PRP RedBox, for example. A singly connected communication device can be respectively connected to the industrial communication network via such an HSR and/or PRP RedBox.

In addition, when searching for corresponding partner stations, the radio transceiver stations can be coordinated such that a data transmission is briefly interrupted during the search and available partner stations are searched for on other radio channels. For this purpose, two radio transceiver stations assigned to the same HSR and/or PRP RedBox can interchange a scan token with one another. This scan token stipulates which radio transceiver Station is actively transmitting data and which radio transceiver station is performing a scan for available partner stations that are assigned to a respective other HSR and/or PRP RedBox.

In a further embodiment of the radio communication system in accordance with the invention, at least a first network infrastructure device and a second network infrastructure device that are assigned to the industrial communication network and each have a plurality of communication network connections and a coupling element that connects the communication network connections to one another are provided. The network infrastructure devices may be switches, for example. The coupling element of a network infrastructure device is preferably a high-speed bus or a backplane switch with an associated controller. The first communication device is redundantly connected to the first network infrastructure device via its first and second communication network connections, whereas the second communication device is redundantly connected to the second network infrastructure device via its first and second communication network connections.

In addition, the first and second communication devices and/or the first and second network infrastructure devices are configured in accordance with the further embodiment of the radio communication system in accordance with the invention such that data frames transmitted from the first communication network connection of the first and second communication devices to the respective network infrastructure device are assigned to a first virtual local area network and data frames transmitted from the second communication network connection of the first and second communication devices to the respective network infrastructure device are assigned to a second virtual local area network. The respective radio transceiver stations are connected to the network infrastructure devices. In addition, the radio transceiver stations and/or the network infrastructure devices are configured such that data frames assigned to the first virtual local area network are transmitted via a first radio network via the respective first radio transceiver station and data frames assigned to the second virtual local area network are transmitted via a second radio network via the respective second radio transceiver station. The first and second radio networks can be advantageously identified by means of a radio network identifier, such as via a service set identifier. In principle, the first and second radio transceiver stations can each be assigned to at least the first and second radio networks.

With the method in accordance with the invention for operating the radio communication system for the industrial automation system, at least a first communication device and a second communication device are redundantly connected to an industrial communication network. Here, the first and second communication devices each have at least a first communication network connection and a second communication network connection, and a signal processing unit which is connected to the first and second communication network connections. The signal processing unit forwards data frames to be transmitted to both communication network connections in a parallel manner and detects redundant data frames received from both communication network connections.

In accordance with the invention, the first and second communication devices are each connected directly or indirectly via their first communication network connection to a respective first radio transceiver station. In a corresponding manner, the first and second communication devices are each connected directly or indirectly via their second communication network connection to a respective second radio transceiver station. The first and second radio transceiver stations determine an order for data frames to be transmitted within a predefined interval of time based on destination MAC addresses assigned to the data frames to be transmitted. Here, the order within data frames to be transmitted to a selected destination MAC address is determined by the order in which they are received. In addition, the first and second radio transceiver stations that are connected to the same communication device coordinate their orders for data frames to be transmitted such that both radio transceiver stations always transmit data frames to different destination MAC addresses.

Mutually redundant data frames are indicated by a uniform sequence number. Here, the signal processing units in the first and second communication devices allocate a sequence number to a data frame to be redundantly transmitted. In accordance with a particularly preferred embodiment of the method in accordance with the invention, the first and second radio transceiver stations, if a data frame transmitted via the first or second radio network is successfully received, transmit a confirmation message, at the receiver end, to a radio transceiver station at the transmitter end. The radio transceiver stations or the network infrastructure devices advantageously prevent transmission of a redundant data frame having a sequence number assigned to a confirmation message received at the transmitter end.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below using an exemplary embodiment with reference to the drawing, in which.

DETAILED DESCRIPTION OF THE EXEMPLARY EMBODIMENTS

Figure 1:
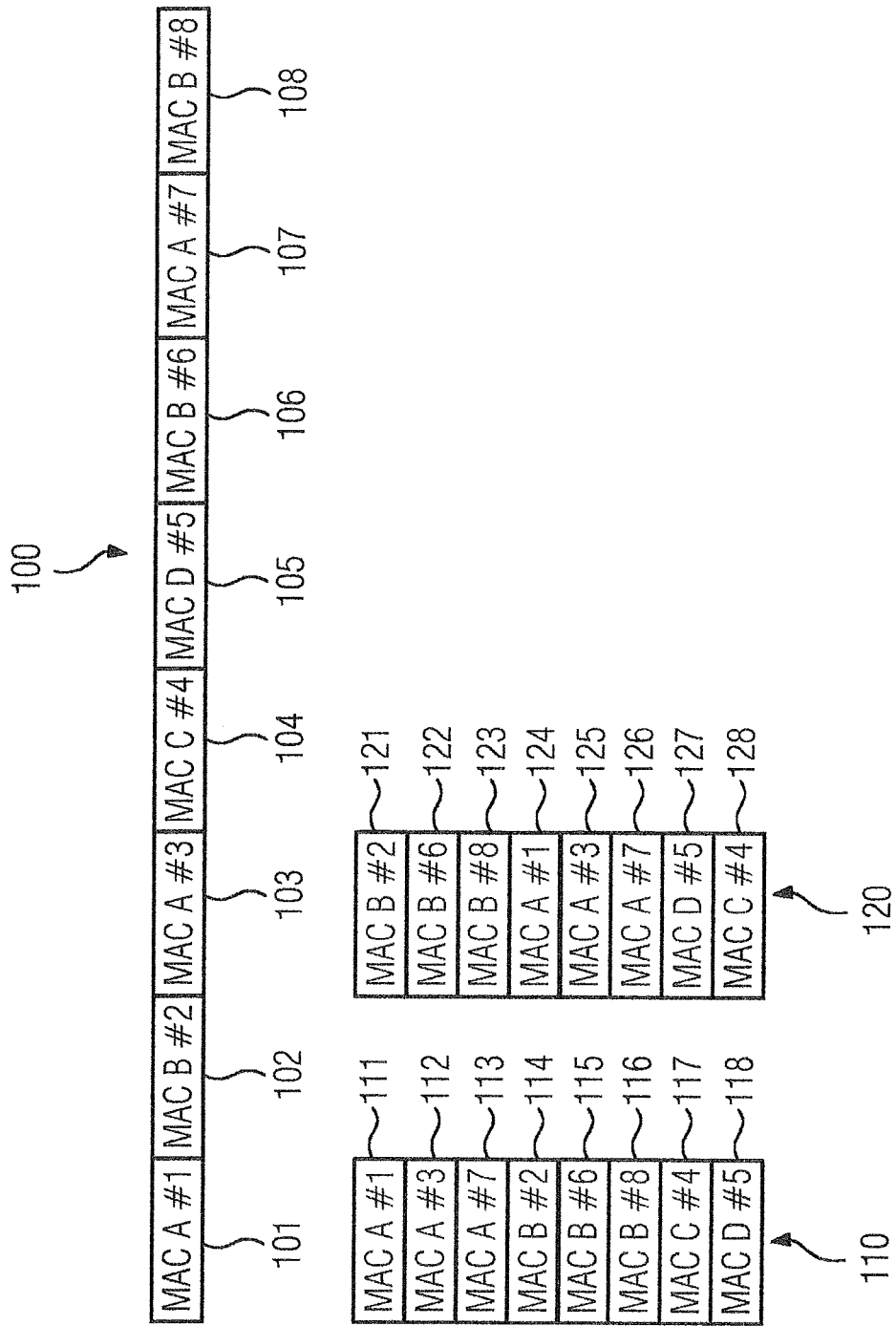
FIG. 1 shows a schematic illustration of transmission queues in a first WLAN station and a second WLAN station of a radio communication system for an industrial automation system in accordance with the invention.
Figure 2:
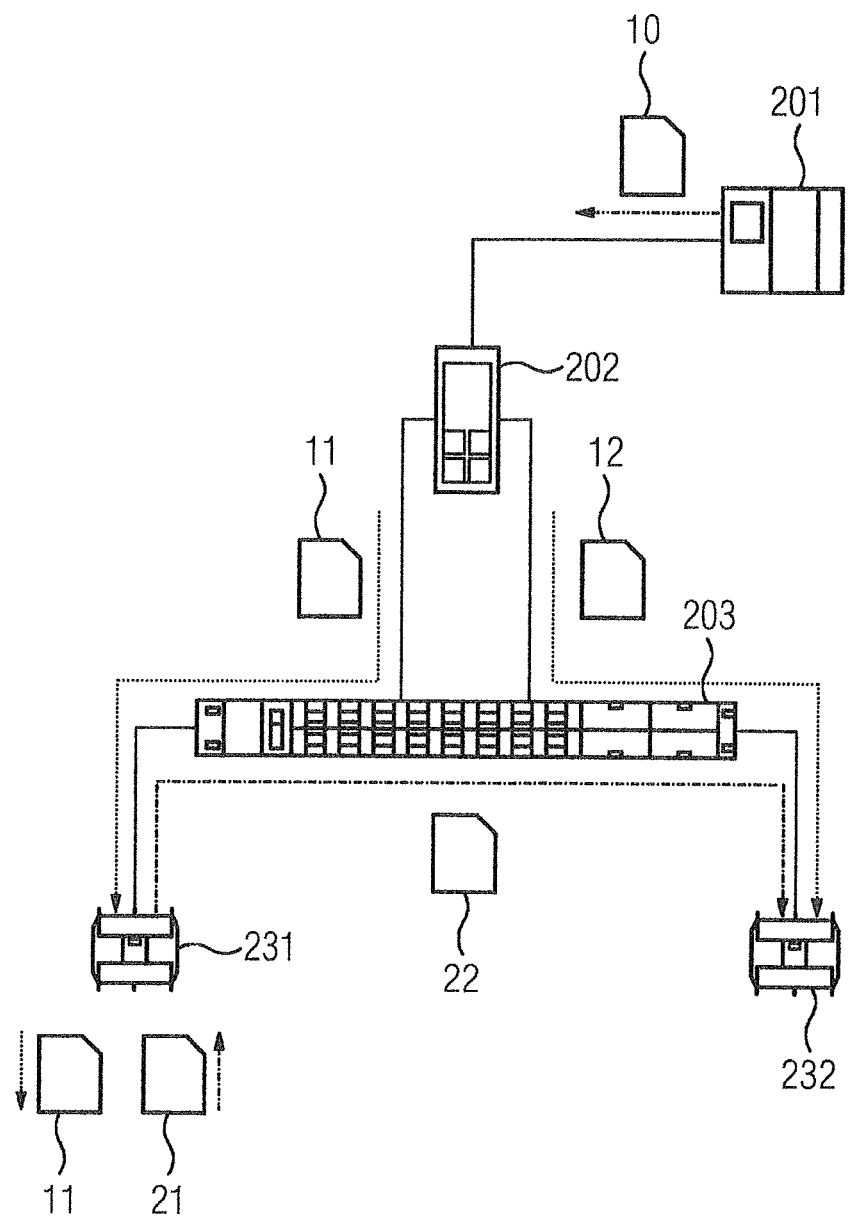
FIG. 2 shows a first part of a radio communication system for an industrial automation system having a first HSR/PRP RedBox, a first switch with VLAN capability and a plurality of WLAN transceiver stations connected to the first switch in accordance with the invention.
Figure 3:
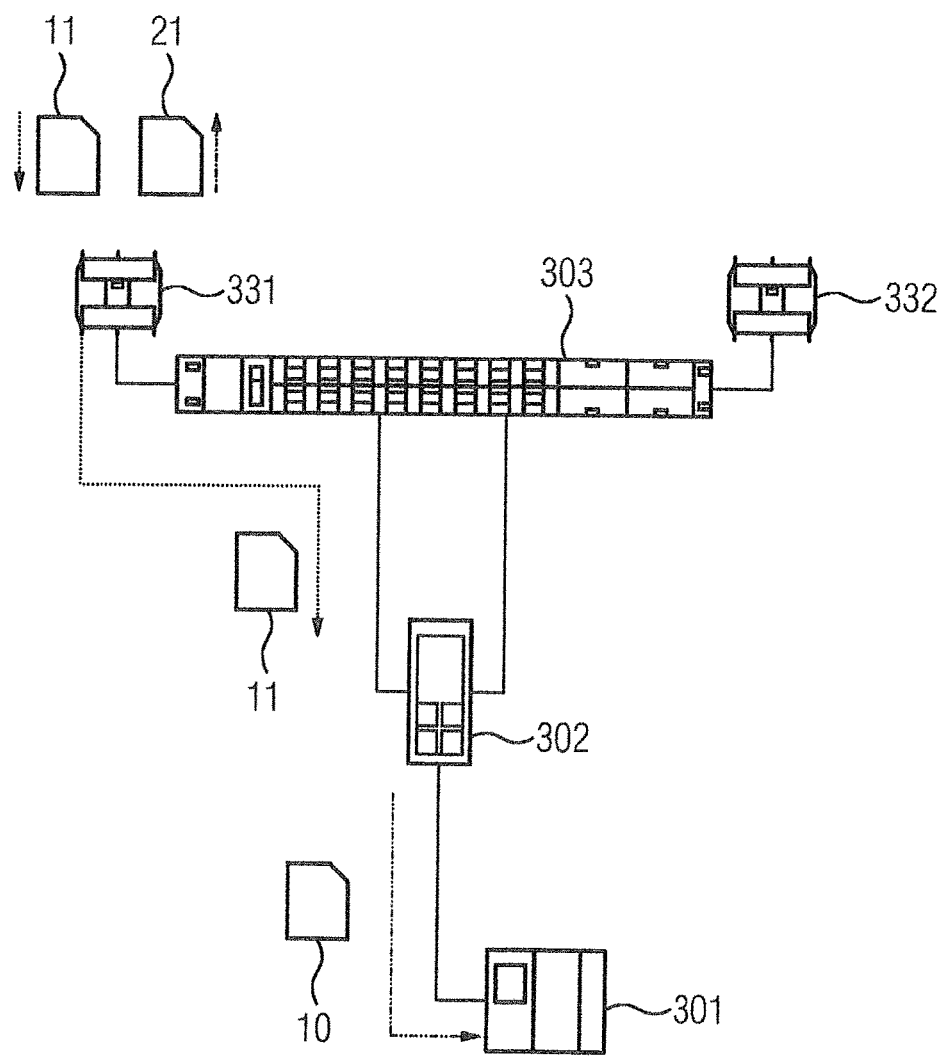
FIG. 3 shows a second part of a radio communication system for an industrial automation system having a second HSR/PRP RedBox, a second switch with VLAN capability and a plurality of WLAN transceiver stations connected to the second switch in accordance with the invention.

FIG. 1 schematically illustrates data frames 111-118, 121-128 queued in transmission queues 110, 120 in a first WLAN station 231 and a second WLAN station 232 of a radio communication system. This radio communication system comprises a first part at the transmitter end, which is illustrated in FIG. 2, and a second part at the receiver end, which is illustrated in FIG. 3. Both transmission queues 110, 120 are based on the same input sequence 100 of data frames 101-108 received from a first HSR/PRP RedBox 202. The first HSR/PRP RedBox 202 is assigned to the first part of the radio communication system illustrated in FIG. 2 and is indirectly connected via a first switch 203 with VLAN capability to the first WLAN station 231 and to the second WLAN station 232. The first HSR/PRP RedBox 202 also comprises at least three communication network connections. The first HSR/PRP RedBox 202 is redundantly connected to a first switch 203 with VLAN capability via a first communication network connection and a second communication network connection. In the present exemplary embodiment, a Supervisory Control and Data Acquisition (SCADA) system 201 is connected at the control system level to an interlink port which constitutes a third communication network connection of the first HSR/PRP RedBox 202.

The WLAN stations 231, 232 can selectively perform a role as a WLAN access point or a WLAN client. Instead of WLAN stations, it is also possible to use, in principle, radio transceiver stations for a WiMAX, a UMTS, an LTE mobile radio network or another mobile radio network. The statements below similarly apply thereto. For an increased data throughput with respect to data frames 111-118, 121-128 transmitted by WLAN, data frames to be transmitted within a predefined interval of time are no longer transmitted by the WLAN stations according to FIG. 1, after duplication via an HSR/PRP RedBox, in accordance with the FIFO principle, but rather in their transmission order sorted according to destination MAC addresses. Here, an original order according to reception times at the respective WLAN station is retained inside a destination MAC address.

For example, the data frames 101, 103, 107 for the destination MAC address MAC A that are at the first, third and seventh positions inside the input sequence 100 are queued at the first to third positions in the transmission queue 110 in the first WLAN station 231. In contrast, these data frames are queued only at the fourth to sixth positions in the transmission queue 120 in the second WLAN station 232. Conversely, the data frames 102, 106, 108 for the destination MAC address MAC B that are at the second, sixth and eighth positions inside the input sequence 100 are queued at the first to third positions in the transmission queue 120 in the second WLAN station 232. In contrast, these data frames are queued only at the fourth to sixth positions in the transmission queue 110 in the first WLAN station 231. The data frame 104 for the destination MAC address MAC C that is at the fourth position inside the input sequence 100 is queued at the seventh position in the transmission queue 110 in the first WLAN station 231 and is queued at the eighth position in the transmission queue 120 in the second WLAN station. In a similar manner, the data frame 105 for the destination MAC address MAC D that is at the fifth position inside the input sequence 100 is queued at the eighth position in the transmission queue 110 in the first WLAN station 231 and is queued at the seventh position in the transmission queue 120 in the second WLAN station. Overall, coordinated transmission queue management at partner WLAN stations assigned to one another ensures that data frames are never transmitted to the same destination MAC address at the same time via the two partner WLAN stations.

With reference to FIG. 3, the second part of the industrial communication system comprises a second HSR/PRP RedBox 302 that likewise has at least three communication network connections. The second HSR/PRP RedBox 302 is redundantly connected to a second switch 303 with VLAN capability via a first communication network connection and a second communication network connection. In the present exemplary embodiment, a sensor or actuator system 301 of an industrial automation system is connected at the field level to an interlink port that constitutes a third communication network connection of the second HSR/PRP RedBox 302. This sensor or actuator system 301 may be, for example, a manufacturing robot, a drive for a conveyor system or an operating and observation station on a production line. The second part of the industrial communication system 2 also comprises WLAN stations 331, 332 that are connected to the second switch 303 and can likewise selectively perform a role as a WLAN access point or a WLAN client.

The first switch 203 and the second switch 303 each comprise a plurality of communication network connections and a coupling element connecting the communication network connections to one another. Such a coupling element may be implemented, for example, via a high-speed bus or a backplane switch with an associated controller.

The first HSR/PRP RedBox 202 and the second HSR/PRP RedBox 302 each have a signal processing unit that is connected to their communication connections and that has a multiplexer unit for forwarding data frames to be transmitted to the respective first and second communication network connections in a parallel manner. A multiplexer unit duplicates data frames 10 transmitted from a communication or automation device singly connected to the industrial communication system. Mutually redundant data frames 11, 12 are indicated by a uniform sequence number that is allocated by the respective signal processing unit to data frames to be redundantly transmitted. The mutually redundant data frames 11, 12 are then transmitted from the respective HSR/PRP RedBox 202, 302 to the first switch 203 and to the second switch 303, respectively. The first switch 203 and the second switch 303 then forward these data frames 11, 12 to a respective first WLAN station 231, 331 and a second WLAN station 232, 332.

In addition, the first HSR/PRP RedBox 202 and the second HSR/PRP RedBox 302 each have a redundancy handling unit for processing data frames received from the respective first and second communication network connections. The redundancy handling unit in turn comprises a filter unit that is provided to detect and filter received redundant data frames. The respective signal processing unit is also respectively assigned a storage unit that stores sequence numbers of data frames that have already been received in an error-free manner. If a new data frame is received, then the redundancy handling unit checks it for a match with a sequence number that has already been stored. In the present exemplary embodiment, data frames to be redundantly transmitted are transmitted in accordance with the Parallel Redundancy Protocol. In principle, transmission is also possible in accordance with High-availability Seamless Redundancy. The statements below similarly apply thereto.

Data frames transmitted from the first communication network connection of the first HSR/PRP RedBox 202 and of the second HSR/PRP RedBox 302 to the respective switch 203, 303 are assigned to a first VLAN. In a similar manner, data frames transmitted from the second communication network connection of the first HSR/PRP RedBox 202 and of the second HSR/PRP RedBox 302 to the respective switch 203, 303 are assigned to a second VLAN. Data frames assigned to the first VLAN are transmitted via the respective first WLAN station 231, 331 via a first WLAN network having a first WLAN SSID, whereas data frames assigned to the second VLAN are transmitted via the respective second WLAN station 232, 332 via a second WLAN network having a second WLAN SSID. Here, the first WLAN SSID and the second WLAN SSID differ from one another. In principle, the first WLAN stations 231, 331 and the second WLAN stations 232, 332 can also be assigned to the second WLAN network and the first WLAN network, respectively, for other data traffic.

If a data frame transmitted via the first or second WLAN network is successfully received, the WLAN stations 231, 232, 331,332 transmit, at the receiver end, an acknowledge message 21 to a WLAN station 231 at the transmitter end. If an acknowledgement message 21 is received, then this WLAN station 231 at the transmitter end transmits a drop frame message 22 to its associated partner WLAN station 232 that is connected to the same switch 203. In response to such a drop frame message 22, the respective partner WLAN station 232 prevents transmission of a redundant data frame having a sequence number assigned to an acknowledgement message 21 received at the transmitter end. This can be implemented, for example, by deleting or discarding a redundant data frame from a transmission queue in the partner WLAN station, in particular as soon as this data frame arrives at the partner WLAN station following transmission from the respective switch.

Figure 4:
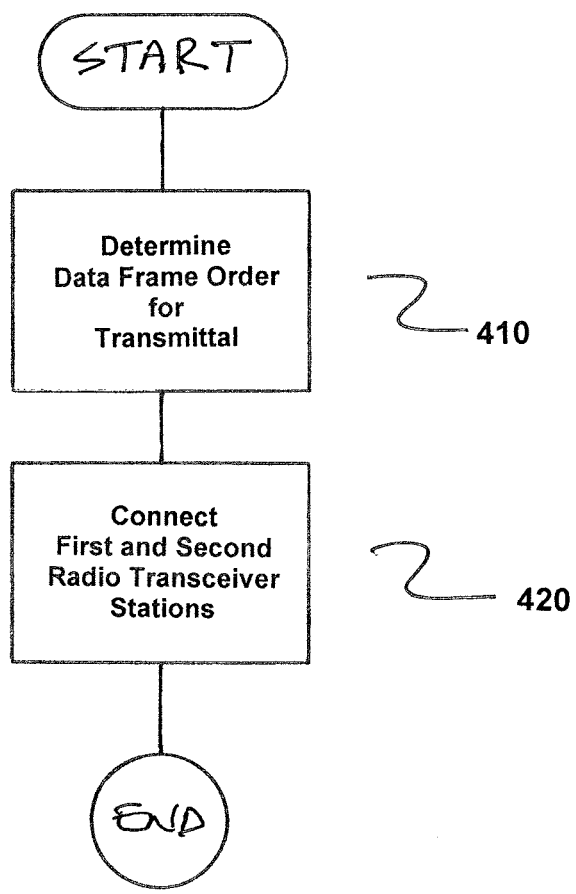
FIG. 4 is a flowchart of the method in accordance with the invention.

FIG. 4 is a flowchart of a method for operating a radio communication system for an industrial automation system in which at least a first communication device 202 and a second communication device 302 are redundantly connected to an industrial communication network, where the first and second communication devices each include at least a first communication network connection and a second communication network connection, and include a signal processing unit which is connected to the first and second communication network connections, which forwards data frames to be transmitted to both communication network connections in a parallel manner and which detects redundant data frames 11, 12 received from both communication network connections, where the first and second communication devices 202, 302 are each connected directly or indirectly via their first communication network connection to a respective first radio transceiver station 231, 331, and where the first 202 and second communication devices 302 are each connected directly or indirectly via their second communication network connection to a respective second radio transceiver station 232, 332.

The method comprises determining, by the first 231, 331 and second radio transceiver stations 232, 332, an order for data frames 111-118, 121-128 to be transmitted within a predefined interval of time based on destination MAC addresses assigned to the data frames to be transmitted, as indicated in step 410. Here, the order within data frames to be transmitted to a selected destination MAC address is determined by the order in which they are received.

Next, the first 231, 331 and second radio transceiver stations 232, 332 which are connected to the same communication device, coordinate orders for data frames 111-118, 121-128 to be transmitted via transmission queue management such that the first 231, 331 and second radio transceiver stations 232, 332 radio never transmit data frames 111-118, 121-128 to the same destination MAC address at the same time, as indicated in step 420.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A radio communication system for an industrial automation system, comprising:
   at least a first communication device and a second communication device which are redundantly connected to an industrial communication network and which each include:
      at least a first communication network connection and a second communication network connection; and
      a signal processing unit which is connected to the first and second communication network connections and which includes a multiplexer unit for forwarding data frames to be transmitted to the first and second communication network connections in a parallel manner and which includes a redundancy handling unit for processing data frames received from the first and second communication network connections, the redundancy handling unit comprising a filter unit which is configured to detect received redundant data frames;
   wherein the first and second communication devices are each connected directly or indirectly via their respective first communication network connections to a respective first radio transceiver station;

wherein the first and second communication devices are each connected directly or indirectly via their respective second communication network connections to a respective second radio transceiver station;

wherein the first and second radio transceiver stations are configured such that an order for data frames to be transmitted within a predefined interval of time is determined based on destination MAC addresses assigned to the data frames to be transmitted, the order within data frames to be transmitted to a selected destination MAC address being determined by an order in which they are received;

wherein the first and second radio transceiver stations are configured such that the first and second radio transceiver stations connected to the same communication device coordinate their orders for data frames to be transmitted via transmission queue management such that first and second radio transceiver stations never transmit data frames to the same destination MAC address at the same time.

2. The communication system as claimed in claim 1, wherein mutually redundant data frames are indicated by a uniform sequence number; and wherein the signal processing units in the first and second communication devices are configured to allocate a sequence number to a data frame to be redundantly transmitted.

3. The communication system as claimed in claim 2, wherein the first and second radio transceiver stations are configured and such that, if a data frame transmitted via a radio network is successfully received, then a confirmation message is transmitted, at a receiver end, to a radio transceiver station at a transmitter end.

4. The communication system as claimed in claim 3, wherein the radio transceiver stations are configured such that transmission of a redundant data frame having a sequence number assigned to a confirmation message received at the transmitter end is prevented.

5. The communication system as claimed in claim 1, wherein data frames to be redundantly transmitted are transmitted in accordance with at least one of (i) High-availability Seamless Redundancy (HSR) and (ii) a Parallel Redundancy Protocol (PRP).

6. The communication system as claimed in claim 5, wherein the first and second communication devices comprise an HSR and/or PRP RedBox.

7. The communication system as claimed in claim 6, wherein a singly connected communication device is respectively connected to the industrial communication network via the first and second communication devices.

8. The communication system as claimed in claim 1, wherein the radio transceiver stations are assigned at least to one of (i) a Wireless Local Area Network, (ii) a Worldwide Interoperability for Microwave Access (WiMAX), (iii) a Universal Mobile Telecommunications System (UMTS) and (iv) a long term evolution (LTE) mobile radio network or another mobile radio network.

9. The communication system as claimed in claim 1, further comprising:

at least a first network infrastructure device and a second network infrastructure device which are assigned to the industrial communication network and which each include a plurality of communication network connections and a coupling element which interconnects the communication network connections;

wherein the first communication device is redundantly connected to the first network infrastructure device via its first and second communication network connections;

wherein the second communication device is redundantly connected to the second network infrastructure device via its first and second communication network connections;

wherein at least one of (i) the first and second communication devices and (ii) the first and second network infrastructure devices are configured and such a manner that data frames transmitted from the first communication network connection of the first and second communication devices to the respective network infrastructure device are assigned to a first virtual local area network and data frames transmitted from the second communication network connection of the first and second communication devices to the respective network infrastructure device are assigned to a second virtual local area network;

wherein the respective radio transceiver stations are connected to the network infrastructure devices; and wherein at least one of (i) the radio transceiver stations and (ii) the network infrastructure devices are configured such that data frames assigned to the first virtual local area network are transmitted via a first radio network by the respective first radio transceiver station and data frames assigned to the second virtual local area network are transmitted via a second radio network by the respective second radio transceiver station.

10. A method for operating a radio communication system for an industrial automation system in which at least a first communication device and a second communication device are redundantly connected to an industrial communication network, the first and second communication devices each including at least a first communication network connection and a second communication network connection, and including a signal processing unit which is connected to the first and second communication network connections, which forwards data frames to be transmitted to both communication network connections in a parallel manner and which detects redundant data frames received from both communication network connections, the first and second communication devices each being connected directly or indirectly via their first communication network connection to a respective first radio transceiver station, the first and second communication devices each being connected directly or indirectly via their second communication network connection to a respective second radio transceiver station, the method comprising:

determining, by the first and second radio transceiver stations, an order for data frames to be transmitted within a predefined interval of time based on destination MAC addresses assigned to the data frames to be transmitted, the order within data frames to be transmitted to a selected destination MAC address being determined by the order in which they are received; and coordinating, by the first and second radio transceiver stations which are connected to the same communication device, orders for data frames to be transmitted via transmission queue management such that the first and second radio transceiver stations radio never transmit data frames to the same destination MAC address at the same time.

11. The method as claimed in claim 10, wherein mutually redundant data frames are indicated by a uniform sequence number; and wherein the signal processing units in the first and second communication devices allocate a sequence number to a data frame to be redundantly transmitted.

12. The method as claimed in claim 11, wherein if a data frame transmitted via a radio network is successfully received, the first and second radio transceiver stations then transmit, at a receiver end, a confirmation message to a radio transceiver station at a transmitter end.

13. The method as claimed in claim 12, wherein the first and second radio transceiver stations prevent transmission of a redundant data frame having a sequence number assigned to a confirmation message received at the transmitter end.

14. The method as claimed in claim 13, wherein data frames to be redundantly transmitted are transmitted in accordance with at least one of (i) High-availability Seamless Redundancy (HSR) Protocol and (ii) Parallel Redundancy (PRP) Protocol.

15. The method as claimed in claim 11, wherein data frames to be redundantly transmitted are transmitted in accordance with at least one of (i) High-availability Seamless Redundancy (HSR) Protocol and (ii) Parallel Redundancy (PRP) Protocol.

16. The method as claimed in claim 10, wherein data frames to be redundantly transmitted are transmitted in accordance with at least one of (i) High-availability Seamless Redundancy (HSR) Protocol and (ii) Parallel Redundancy (PRP) Protocol.

17. The method as claimed in claim 10, wherein the industrial automation system includes at least a first network infrastructure device and a second network infrastructure device which are assigned to the industrial communication network and each have a plurality of communication network connections and a coupling element which connects the communication network connections to one another;
    wherein the first communication device is redundantly connected to the first network infrastructure device via its first and second communication network connections;
    wherein the second communication device is redundantly connected to the second network infrastructure device via its first and second communication network connections;
    wherein data frames transmitted from the first communication network connection of the first and second communication devices to the respective network infrastructure device are assigned to a first virtual local area network and data frames transmitted from the second communication network connection of the first and second communication devices to the respective network infrastructure device are assigned to a second virtual local area network;
    wherein the respective radio transceiver stations are connected to the network infrastructure devices; and
    wherein data frames assigned to the first virtual local area network are transmitted via a first radio network by the respective first radio transceiver station and data frames assigned to the second virtual local area network are transmitted via a second radio network by the respective second radio transceiver station.

18. A radio transceiver station comprising:
a processor; and
memory;
wherein the radio transceiver station is configured such that an order for data frames to be transmitted is determined based on destination media access layer (MAC) addresses assigned to the data frames to be transmitted, the order within the data frames to be transmitted to a selected destination MAC address being determined by the order in which they are received; and
wherein a first radio transceiver station and a second radio transceiver station which are connected to the same communication device coordinate their orders for data frames to be transmitted via transmission queue management such that both radio transceiver stations never transmit data frames to the same destination MAC address at the same time.

* * * * *